United States Patent

[11] 3,558,849

| [72] | Inventors | Reginald Catherall;<br>Anthony John Ley; Rodney Walter<br>Levinge, Farnborough, England |
|---|---|---|
| [21] | Appl. No. | 720,208 |
| [22] | Filed | Apr. 10, 1968 |
| [45] | Patented | Jan. 26, 1971 |
| [73] | Assignee | The Solartron Electronic Group Limited<br>Farnborough, England<br>a corporation of the United Kingdom |
| [32] | Priority | Apr. 11, 1967 |
| [33] | | Great Britain |
| [31] | | 16491 |

[54] WELDING CONTROL
22 Claims, 5 Drawing Figs.

| [52] | U.S. Cl. | 219/110 |
|---|---|---|
| [51] | Int. Cl. | B23k 11/24 |
| [50] | Field of Search | 219/108–110, 112, 114 |

[56] References Cited
UNITED STATES PATENTS
3,345,493 10/1967 Guettel et al. ............... 219/110

Primary Examiner—J. V. Truhe
Assistant Examiner—J. G. Smith
Attorneys—William R. Sherman, Stewart F. Moore and Jerry M. Presson ABSTRACT: The duration of a resistance-welding operation is controlled by deriving two successions of electrical signals which depend upon voltage across and the current through the electrodes respective, deriving from the first and second signals a succession of third signals dependent upon the impedance of the workpiece, detecting the difference between each third signal and the next succeeding third signal, and stopping the welding operation when the difference reaches a predetermined amount.

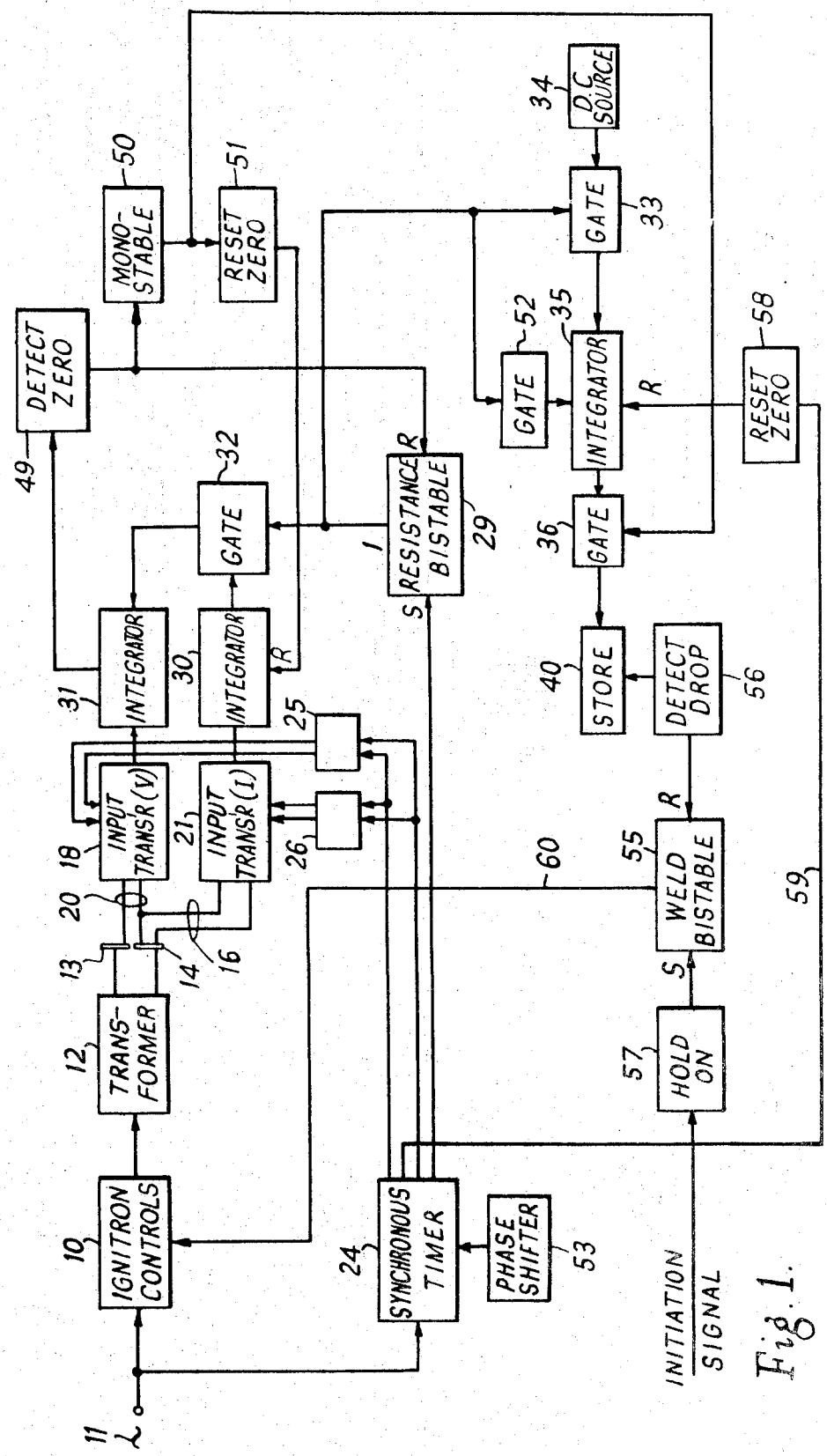

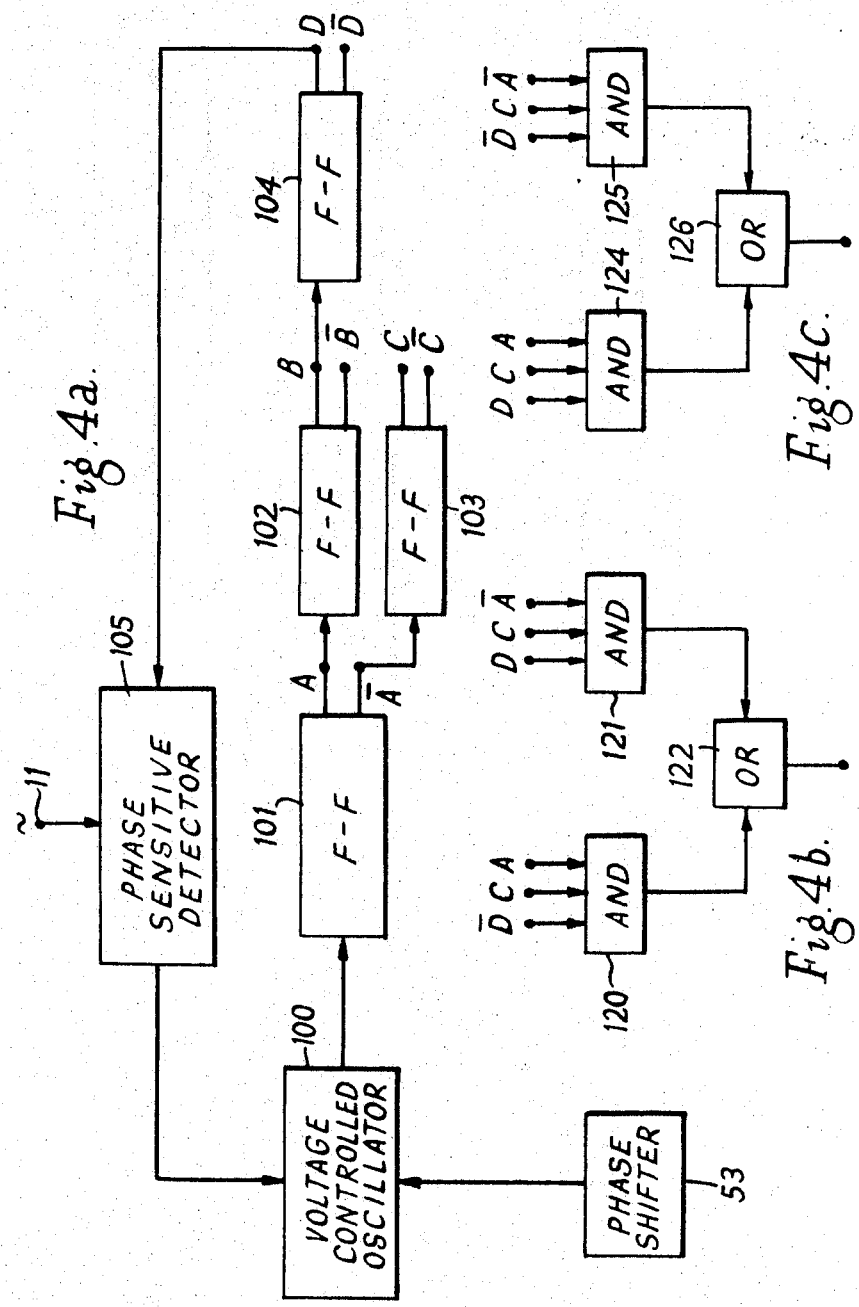

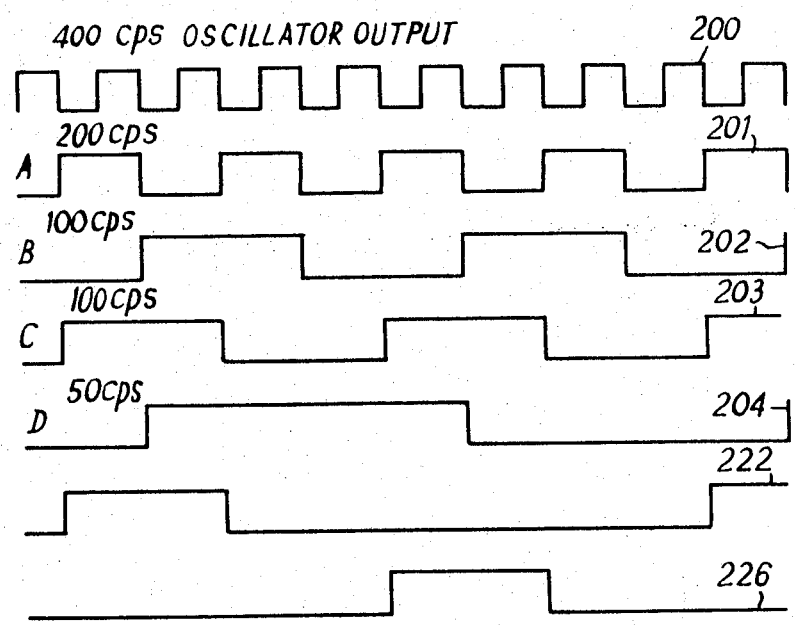
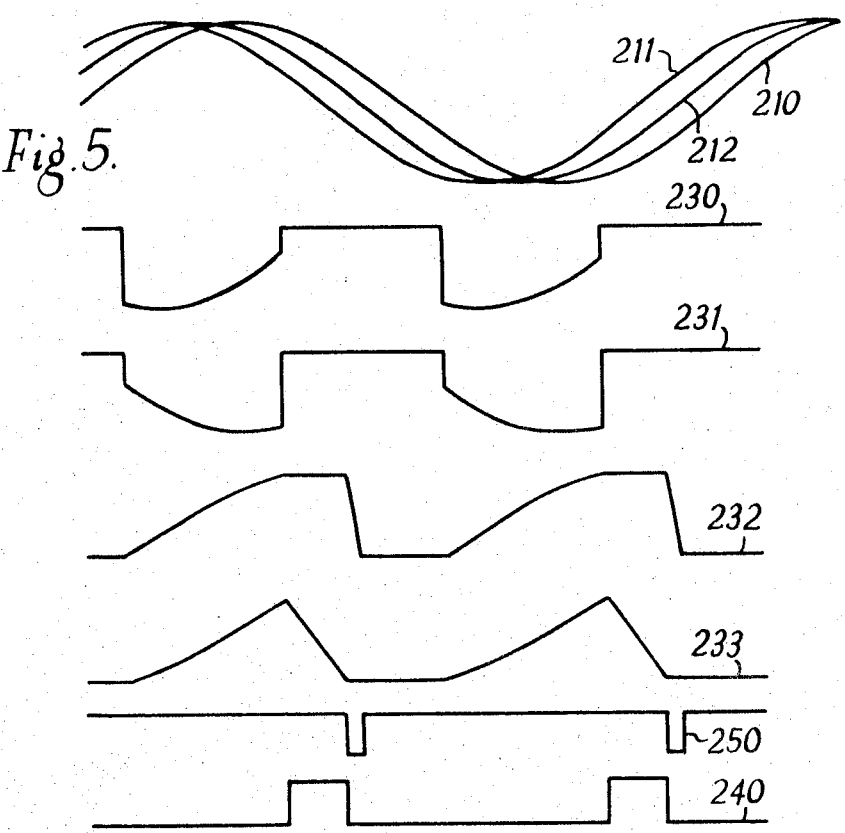
Fig.5.

WELDING CONTROL

This invention relates to a method of and apparatus for controlling the duration of a resistance welding operation.

Resistance welding equipment is normally controlled by a timer which stops the weld after a predetermined number of cycles of the alternating welding current, and commonly uses full-wave ignitron switching, since it is necessary to break the welding current circuit to within one half-cycle.

Because of fluctuations in the supply voltage, such as may be caused by neighboring welders, and because of inherent unbalance in the ignitrons, the power delivered in each half-cycle is not exactly constant. When a timer is used to control the duration of the welding current flow, some welds will receive insufficient power to form a proper weld while others will receive too much power, which is equally detrimental. For this reason one large user of spot welds has to specify up to 80 percent redundancy in welds to ensure that the required strength is obtained.

When a timer is used, it has to be readjusted each time the equipment is used to weld a different kind of workpiece. It is desirable therefore to provide a means of controlling the duration of a weld which provides the correct weld duration independent of variations in the source voltage, and in the nature of the workpieces and unbalance in the ignitrons.

It has been proposed, for use with low current welders, to measure the voltage across the welding electrodes continuously during the duration of the weld and to compare the voltage at any instant with the initial or maximum voltage. Some proposals compensate to some degree for changes in applied voltage by measuring also the current through the workpiece. Such proposals have however not been generally adopted, and nearly all resistance welders are are still controlled by a timer.

In resistance welding the resistance of the workpiece decreases while it is being heated and when the metals start melting the resistance suddenly drops considerably. If the welding current is allowed to continue this results in discharge of molten metal from the weld causing a "splashed" weld. We have found that it is desirable that the current flow should be stopped immediately after the commencement of the sudden drop in resistance, and this invention exploits this discovery to provide a consistently reliable method of controlling the duration of a resistance welding operation.

According to the invention there is provided a method of resistance welding comprising the steps of positioning a workpiece between two electrodes, initiating current flow through the electrodes and the workpiece, deriving a succession of first electrical signals each being dependent upon the voltage between the electrodes throughout a respective one of a succession of predetermined periods, deriving a succession of second electrical signals each being dependent upon the current through the electrodes throughout a respective one of the said predetermined periods, deriving a succession of third electrical signals from respective first and second signals, each third signal being dependent upon the impedance of the workpiece throughout the respective one of the predetermined periods, detecting the difference between each third signal and the next succeeding third signal, and stopping the current flow when the said difference reaches a predetermined amount.

Apparatus for carrying out the method described above is also provided, comprising a first input circuit including means for deriving from a first input thereto a succession of first electrical signals each being dependent upon the first input throughout a respective one of a succession of predetermined periods, a second input circuit including means for deriving from a second input thereto a succession of second electrical signals each being dependent upon the current through the electrodes throughout a respective one of the said predetermined periods, means for deriving a succession of third electrical signals from respective first and second signals, each third signal being dependent upon the ratio of respective first and second signals, a detector adapted for detecting the difference between each third signal and the next succeeding third signal, and for applying a control signal to an output whereby welding current can be arrested.

According to the invention there is further provided resistance welding apparatus comprising tow two electrodes adapted for contacting a workpiece, means for initiating current flow through the electrodes and the workpiece, means for deriving a succession of first electrical signals each being dependent upon the voltage between the electrodes throughout a respective one of a succession of predetermined periods, means for deriving a succession of second electrical signals each being dependent upon the current through the electrodes throughout a respective one of the said predetermined periods, means for deriving a succession of third electrical signals from respective first and second signals each third signal being dependent upon the impedance of the workpiece during the respective one of the predetermined periods, a detector adapted for detecting the difference between each third signal and the next succeeding third signal, and means for stopping the current flow when the said difference reaches a predetermined amount.

One embodiment of the invention will now be described with reference to the accompanying drawings, in which:

FIG. 1 is a block circuit diagram of resistance welding apparatus;

Figure 3:
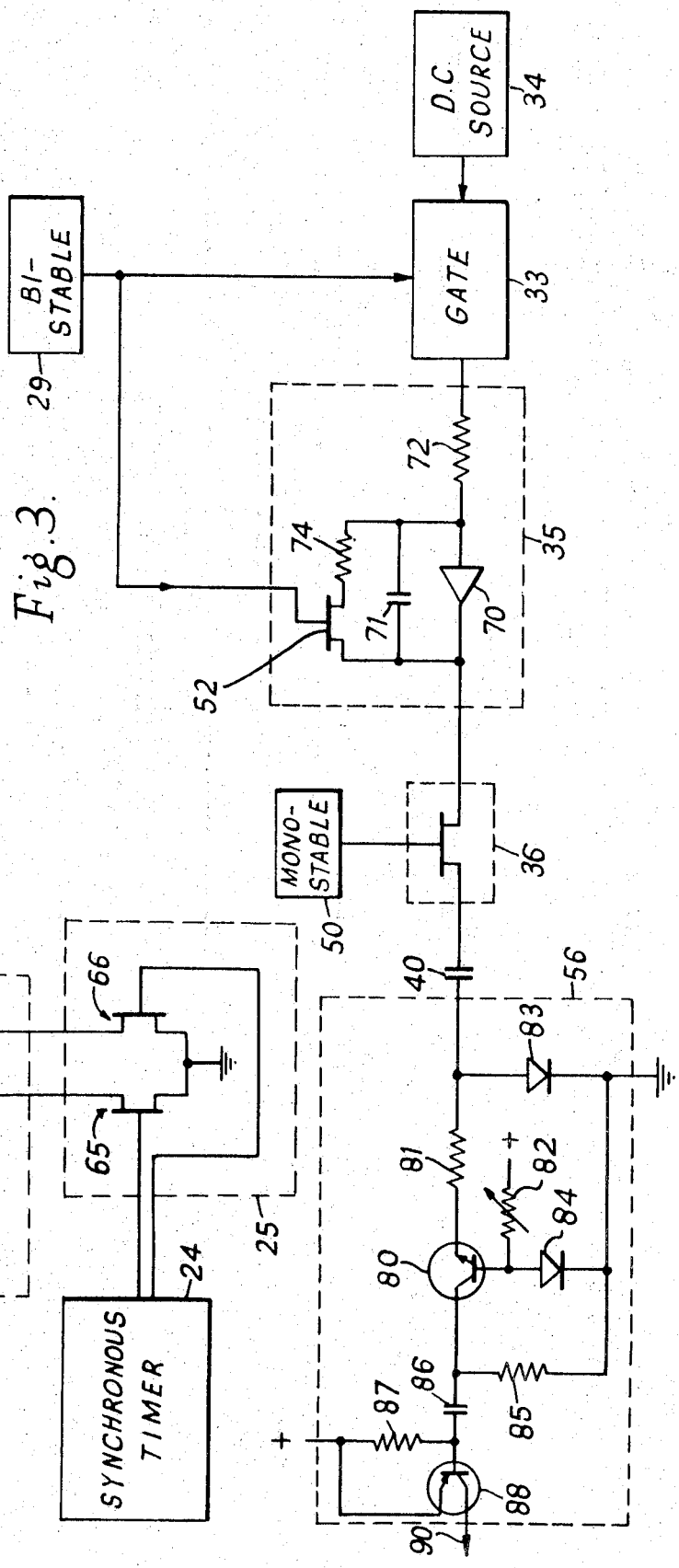
FIG. 3 shows in more detail the integrator 35 and the detect drop circuit 56 of FIG. 1.

FIG. 4a, b and c illustrate parts of the synchronous timer 24 of FIG. 1; and

FIG. 5 shows some waveforms which are present when the apparatus of FIG. 1 is in operation.

In the apparatus illustrated in FIG. 1, ignitron controls 10 are connected to an AC supply 11. A transformer 12 is connected to the output of the ignitron controls 10 and provides power to two welding electrodes 13 and 14. The two electrodes 13 and 14 contact the workpieces in the usual manner.

A line 16 is shown connected to two spaced parts of the electrode 14 and supplies an input to an input transformer (I) 21. A line 20 is connected to the two electrodes 13 and 14 and supplies an input to an input transformer (V) 18. The outputs of the transformers 18 and 21 are connected to respective integrators 31 and 30. The output of the integrator 30 is connected through a gate 32 to a subtractive or reverse polarity input of the integrator 31.

A synchronous timer 24 is connected to the supply 11. The synchronous timer comprises a phase-locked oscillator running at eight times the frequency of the supply 11, and a series of binary dividers giving square-wave signals having frequencies 4, 2 and 1 times the frequency of the supply 11 as described in more detail below. The synchronous timer 24 is connected to two parallel gates 25 and 26 which control the signals passed by the transformer circuits 18 and 21 respectively. A phase shifting circuit 53 is connected to the synchronous timer 24.

A detect zero circuit 49 is connected to the output of the integrator 31. A resistance bistable 29 has a reset input connected to the output of the detect zero circuit 49, and a set input connected to an output of the synchronous timer 24. A monostable 50 is also connected to detect zero circuit 49 and a reset zero circuit 51 is connected to the output of the monostable 50 and to a reset input of the integrator 30.

Two gates 33 and 52 are connected in parallel with the gate 32. Gate 33 has its input connected to a DC source 34 and its output connected to an integrator 35. Gate 52 connects a resistor of suitable value across the integrating capacitor in the integrator 35 to convert the integrator into an exponential function generator during the operation of gate 52. The integrator 35 has its reset input connected to a reset zero circuit 58 which is connected to the synchronous timer 24 by a line 59.

A gate 36 connects the output of the integrator 35 to a capacitor store 40. The gate 36 is connected to the output of the monostable 50. A detect drop circuit 56, described in more detail below, is connected to the store 40 and has its output connected to the reset input of a weld bistable 55. The bistable 55 has its set input connected to receive a weld initiation signal and has its output connected to the ignitron control 10 by a line 60.

The mode of operation of the circuit illustrated in FIG. 1 will now be described. An initiation signal is first applied through a hold-on circuit 57 to the set input of the weld bistable 55. The output of the weld bistable is applied over the line 60 to the ignitron controls 10 and the flow of current commences from the supply 11 through the transformer 12 to the electrodes 13 and 14. The voltage produced across line 16 is dependent upon the current flowing through the electrodes and the workpieces, and the voltage developed across line 20 is dependent upon the voltage across the workpieces.

The gates 25 and 26 and the transformers 18 and 21 together sample each of these voltages. The sampled voltages are passed to the integrators 31 and 30 respectively during one quarter-cycle out of each one half-cycle of the supply voltage, as described in more detail below.

At the end of each of these quarter-cycle sampling periods the voltage at the output of integrator 31 is dependent upon the mean value of the voltage applied across the electrodes 13 and 14 during the quarter-cycle period. The voltage at the output of integrator 30 is dependent upon the mean value of the current flow through the electrodes 14 and 14 during the same sampling period. The gate 32 is then opened and the voltage at the output of the integrator 30 is applied to the subtractive or reverse polarity integrator 31, the signal at the output of the integrator 31 thereby being reduced at a rate proportional to the value of the signal at the output of the integrator 30.

When the output of integrator 31 reaches zero, the detect zero circuit 49 passes a signal to the resistance bistable 29 which closes the gate 32. It can be seen therefore that the time for which the gate 32 is open is proportional to the voltage at the output of integrator 31 divided by the voltage at the output of integrator 30 at the end of each sampling period. The time for which gate 32 is open is thus dependent upon the mean voltage across the electrodes 13 and 14 during each sampling period divided by the mean current flow through the electrodes. In the absence of any inductance in the circuit, the time for which the gate 32 is open would be proportional to the mean resistance between the electrodes during the sampling period.

Gates 33 and 52 are connected in parallel with the gate 32, and gates 33 and 52 are thus open after each sampling period for a time dependent upon the resistance between the electrodes. In practice there are always some inductive effects but it will be sufficient to consider the time for which the gates 32, 33 and 52 are open as being proportional to the resistance between the electrodes.

The gate 33 applies a constant voltage from the DC source 34 to integrator 35 for a time proportional to the resistance between the electrodes. By virtue of gate 52, as described in more detail with reference to FIG. 3, the voltage appearing at the output of the integrator 35 is proportional to the exponential of the resistance between the electrodes during the respective sampling period.

After the gates and 33 and 52 close a signal is applied from the monostable 50 to the gate 36 which opens the gate 36 for a predetermined short interval, for example for one-fortieth of a cycle. The gate 36 applies the signal at the output of the integrator 35 to the store 40.

If the resistance between the electrodes remains constant the store 40 will charge up to a certain value and remain at that value. However, when the resistance falls the charge on the capacitor store falls also. The detect drop circuit 56 detects when the fall of charge on the store exceeds a predetermined amount and applies a signal to the reset input of the weld bistable 55, thus stopping the flow of current through the ignition controls 10.

The synchronous timer 24 is illustrated in FIGS. 4a, b and c. As shown in FIG. 4a, it comprises a voltage voltage-controlled oscillator 100 which supplies an output to a series of divide-by-two flip-flops 101—104. The oscillator 100 runs at eight times the supply frequency, so that if the supply frequency is 50 c.p.s. the oscillator 100 provides a 400 c.p.s. square-wave output. Flip-flop 101 provides two 200 c.p.s. signals A and $\bar{A}$. Flip-flop 102 is connected to receive the signal A and provide two 100 c.p.s. signals B and $\bar{B}$. Flip-flop 103 is connected to receive the signal $\bar{A}$ and provides two further 100 c.p.s. signals C and $\bar{C}$. Flip-flop 104 receives the signal B and provides two 50 c.p.s. signals D and $\bar{D}$.

The relative phases of the signals appearing at the output of the oscillator 100 and flip-flops 101—104 are indicated in FIG. 5. The signal 200 is the 400 c.p.s. output of the oscillator 100. The signals 201—204 are respectively the signals A, B, C and D appearing at one output of the flip-flops 101—104.

A phase-sensitive detector 105 has one input connected to receive the signal D and another connected to the supply input 11 (FIG. 1). The detector 105 provides an output error signal dependent upon the difference in phase between the signal D and the supply voltage. This error signal, together with a signal from the phase shifter 53 are applied to the oscillator 100 to ensure that the oscillator has the desired phase with respect to the mains voltage. The phase shifter 53 comprises a potentiometer which may be manually set.

A typical supply voltage 210 and current 211 are illustrated in FIG. 5. The voltage 210 and current 211 are not in phase due to inductive effects and the synchronous waveform 212 lags by 38° on the current 211. The output 204 of the flip-flop is seen to be in phase quadrature with the synchronous waveform 212. It will be appreciated that although the synchronous waveform 212 is illustrated for convenience, there is no signal in the circuit having such a waveform, since the relative phases of the signals 204 and 212 are predetermined by the phase shifter 53.

The synchronous timer 24 provides a signal to the gates 25 and 26 enabling these gates for a quarter-period about each peak of current flow through the electrodes. To provide signals operating the gates 25 and 26, the timer 24 comprises and AND gate 120, as shown in FIG. 4b, which receives input signals $\bar{D}$, C and A. An AND gate 121 receives signals D, C and $\bar{A}$, and the outputs of the AND gates 120 and 121 are applied to an OR gate 122. The signal 222 at the output of the OR gate 122 is shown in FIG. 5, and is true when either $\bar{D}$, C and A are all true, or when D, C and $\bar{A}$ are all true.

Similarly in FIG. 4c an AND gate 124 receives the signals $\bar{D}$, C and $\bar{A}$, and an AND gate 125 receives the signals D, C and A. An OR gate 126 is connected to the output of both of the AND gates 124 and 125. The output signal 226 appearing at the output of gate 126 is shown in FIG. 5.

The synchronous timer 24 provides a signal setting the bistable 29 simultaneously with the closing of the gates 25 and 26. Such a signal may be derived from the output of an AND gate which has inputs connected to receive the signals A and B. The timer also provides a signal on line 59 to the reset zero circuit 58 to reset the integrator 35. The signal on line 59 may be obtained from the output of an AND gate which has inputs connected to receive the signals A and C.

Assuming the supply frequency to be 50 c.p.s., it will be seen from FIG. 5 that the gates 25 and 26 are opened 2.5 msec. after each zero crossing of waveform 212 and are closed 7.5 msec. thereafter. The input to the integrator 30 is the waveform 230 in FIG. 5, and the input to the integrator 31 is the waveform 231. The output waveform 232 of the integrator 30 increases during the time for which the gate 26 is open, and when the gate 26 is closed, remains at the same value. The output waveform 233 of the integrator 31 increases during the time for which the gate 25 is open, but when the gate 25 closes it decreases at a steady rate proportional to the voltage on the output of integrator 30. When the output of the integrator 31 reaches zero the monostable 50 produces a pulse as indicated in the waveform 250 and the resistance bistable 29 is reset. The time for which the gates 32, 33 and 52 are opened by the resistance bistable 29 are indicated by waveform 240.

The circuit values are so arranged that the time taken for the output of the integrator 31 to be reduced to zero is always less than 4 msec. for the materials with which the equipment is being used. The monostable 50 is arranged to open the gate 36 for 0.5 msec. each time the detect zero circuit 49 detects that the output of integrator 31 reaches zero. The monostable 50 also provides a reset signal to the integrator 30 through a reset zero 51.

As mentioned above, the voltage across the electrodes 13 and 14 and the current through the electrodes are not exactly in phase with each other. When splash occurs, the current flow increases sharply and the inductive effects are increased, thereby increasing this phase difference. By arranging the timer 24 to be in phase with the current through the electrode and not the voltage across them this effect can be used to enhance the drop in resistance, since although the current measured is still the peak current, the voltage peak is not centrally disposed within the sampling period and consequently the mean value of the voltage within the sampling period is reduced. This effect increases the effect due to a reduction in resistance and assists detection of the moment at which splash occurs.

Modifications of the circuit of FIG. 1 may be made; for example, a bistable may be inserted between the detect drop circuit 56 and the weld bistable to enable the device to ignore the first resistance drop and operate on the second. A monostable initiated in parallel with the hold-on monostable 57 would ensure release of the weld bistable in the event of no measurable drop in resistance, and means may be provided to indicate to the operator that there has been no splash.

Figure 2:
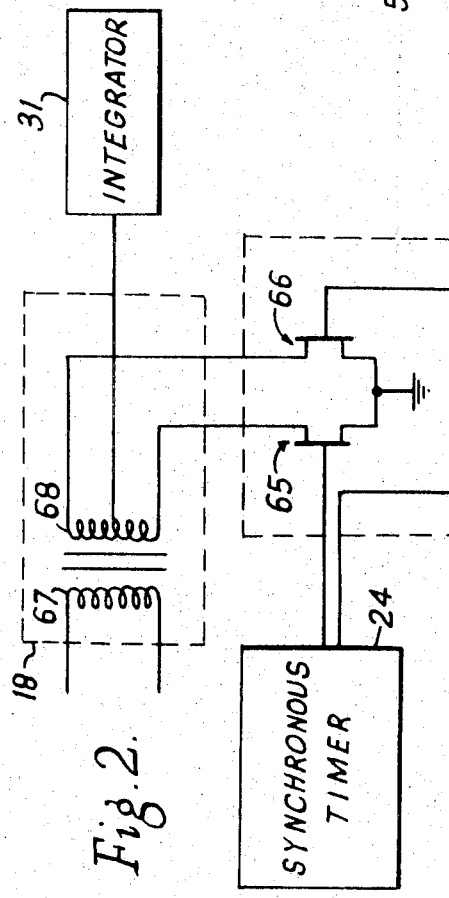
FIG. 2 shows in more detail the gate 25 and transformer 18 of FIG. 1.

Referring now to FIG. 2 of the drawings, there is illustrated in more detail the gate 25 and transformer 18. It will be appreciated that the gate 26 and transformer 21 are identical in construction. The gate 25 comprises two field-effect transistors 65 and 66, the source-drain channels of which are connected between earth and respective ends of the secondary winding 68 of the transformer 18. The gates of the field-effect transistors are controlled by the waveforms 222 and 226 (FIG. 5) so that the transistors are opened alternately during alternate sampling periods. The center tap of the secondary winding 68 provides the output for the transformer and is connected to the input of the integrator 31. It can be seen that the gate 25 operates so as to provide a negative going signal to the input of the integrator 31 for each half-cycle of weld current.

FIG. 3 shows in more detail the integrator 35, gate 36, store 40 and detect drop circuit 56. The integrator 35 comprises an operational amplifier 70 having a capacitor 71 connected between its output and input terminals. A resistor 72 is connected between the input of the amplifier 70 and the gate 33. A resistor 74 is connected in series with a field-effect transistor switch 52 and connects the resistor 74 across the capacitor 71 during the time that the gate 33 is open. Thus the integrator 35 provides an output voltage the value of which is a function of the exponential of the resistance between the electrodes during the sampling period.

When the gate 33 closes, the gate 36, which comprises a field-effect transistor, is opened for 0.5 msec., as described above. The signal on the capacitor 71 is passed to capacitor store 40.

The detect drop circuit 56 comprises a diode 83 connected between the capacitor 40 and earth. Current passes through this diode 83 when the capacitor 40 charges up. If the voltage across capacitor 40 is less than the voltage was across it corresponding to the immediately preceding sampling period, then current flows through the capacitor 40, resistor 81, transistor 80 and resistor 85. This current causes a negative going voltage pulse across the resistor 85 which is passed by capacitor 86. If the amplitude of this pulse exceeds a predetermined value, determined by the bias on transistor 88, the transistor 88 is bottomed and passes a signal over line 90 to the weld bistable, thereby stopping the weld.

The use of an exponential integrator as the integrator 35 simplifies the detect drop circuit 56. The detect drop circuit detects a fixed drop in voltage, which indicates a predetermined percentage drop in the resistance between the electrodes 13 and 14. The apparatus illustrated is sensitive to a drop of 4 percent over most of its range, although the sensitivity does decrease with increasing resistance when the resistance becomes very large. However this is considered quite adequate in practice, since the required percentage sensitivity is less at very high values of the resistance.

Apparatus embodying this invention has been found to be extremely successful, and, by contrast with the large weld redundancies at present required, is found to produce a satisfactory weld for all but 0.1 percent or less of the welds produced.

I claim:

1. A method of resistance welding comprising the steps of positioning a workpiece between two electrodes, initiating current flow through the electrodes and the workpiece, deriving a succession of first electrical signals each being representative of the voltage between the electrodes during a predetermined portion of each successive half-cycle of said current, deriving a succession of second electrical signals each being representative of the current through the electrodes during the same predetermined portions of successive half-cycles, deriving a succession of third electrical signals from respective ones of said first and second signals, each third signal being representative of the impedance of the workpiece throughout the respective ones of the predetermined portions, detecting the difference in magnitude between each third signal and the next succeeding third signal, and stopping the current flow when the difference reaches a predetermined amount.

2. A method according to claim 1, wherein each first signal is substantially proportional to the voltage between the electrodes throughout the respective portion, each corresponding second signal is substantially proportional to the current through the workpiece throughout the same portion, and the step of deriving each third signal comprises deriving the ratio of the respective first and second signals.

3. A method according to claim 2, wherein each predetermined period embraces a peak of current flow.

4. A method according to claim 3, wherein each step of detecting the difference between each third signal and the next succeeding third signal comprises generating a succession of fourth signals each of which is proportional to a function of one of the third signals, charging a capacitor with one of the fourth signals, applying a succeeding fourth signal representative of the next succeeding third signal to the capacitor, detecting a discharge from the capacitor, and generating a signal when the discharge from the capacitor exceeds a predetermined value.

5. A method according to claim 4, wherein each fourth signal is proportional to an exponential function of the respective third signal.

6. Weld control apparatus comprising first input circuit means connected to weld electrodes for deriving a succession of first electrical signals, each being representative of a predetermined portion of successive periods of the voltage across said weld electrodes; second input circuit means for deriving a succession of second electrical signals, each being representative of a predetermined portion of successive periods of the current through said weld electrodes; means for deriving a succession of third electrical signals, each being representative of the ratio between one of said succession of first signals and the one of said succession of second signals which was derived during the same period as the first signal; detector means for receiving said succession of third signals and for producing a control signal representative of the difference of one of said succession of third signals and the next succeeding one of said third signals; and means connected to said detector means for terminating weld current when said control signal reaches a predetermined magnitude.

7. Apparatus according to claim 6, wherein the said successive periods are successive half-cycles of an alternating current.

8. Apparatus according to claim 7, wherein each successive period embraces a peak of current flow.

9. Apparatus according to claim 8, wherein said first input circuit means for deriving a succession of first electrical signals includes a first gate, and said second input circuit means for deriving a succession of second electrical signals includes a second gate, said first and second gates being open throughout the said successive periods, the apparatus further comprising a timer adapted to open the gates throughout the said predetermined periods and to close the gates throughout the periods between the said predetermined periods.

10. Apparatus according to claim 9, wherein the timer comprises an oscillator adapted to run at an integral multiple of the frequency of the alternating current flow and in predetermined phase relation thereto, a series of binary dividers connected to the output of the oscillator, and gating means connected between first and second gates and the output of the oscillator and at least one of the binary dividers to provide signals for opening and closing the said first and second gates.

11. Apparatus according to claim 6 wherein said detector means includes means for storing a fourth signal dependent upon one of said succession of third signals and for applying to said means for storing a fourth signal a succeeding fourth signal dependent upon the next succeeding third signal, means for detecting a discharge from the means for storing a fourth signal and for generating the control signal when the discharge from the means for storing exceeds a predetermined value.

12. Apparatus according to claim 11, wherein the means for storing is adapted to derive each fourth signal as an exponential function of the corresponding third signal.

13. Apparatus according to claim 6, wherein the means for deriving first signals includes a first integrator, the means for deriving second signals includes a second integrator, and the means for deriving the third signals includes a gate connected between the output of one of the integrators and an input of the other integrator, the last said gate being opened after each predetermined period and closed when the output of the first integrator is reduced to zero, whereby the time for which the last said gate is open is dependent upon the ratio of corresponding first and second signals.

14. Resistance welding apparatus comprising two electrodes adapted for contacting a workpiece, means for initiating current flow through the electrodes and the workpiece, means for deriving a succession of first electrical signals each being representative of the voltage between the electrodes throughout a respective one of a succession of predetermined periods, means for deriving a succession of second electrical signals each being representative of the current through the electrodes throughout a respective one of the said predetermined periods, means for deriving a succession of third electrical signals from respective first and second signals, each third signal being dependent upon the impedance of the workpiece during the respective one of the predetermined periods, a detector adapted for detecting the difference between each third signal and the next succeeding third signal, and means for stopping the current flow when said difference reaches a predetermined amount.

15. Apparatus according to claim 14, wherein each first signal is substantially proportional to the voltage between the electrodes throughout the respective period, each corresponding second signal is substantially proportional to the current through the workpiece throughout the same period, and the means for deriving a succession of third electrical signals comprises means for deriving the ratio of the corresponding first and second signals.

16. Apparatus according to claim 14, wherein the said current flow is an alternating current flow, and the said predetermined periods are arranged to occur during successive half-cycles of the alternating current.

17. Apparatus according to claim 16, wherein each predetermined period embraces a peak of current flow.

18. Apparatus according to claim 16, wherein the means for deriving a succession of first electrical signals includes a first gate, and the means for deriving a succession of second electrical signals includes a second gate, the first and second gates being open throughout the said predetermined periods, the apparatus further comprising a timer adapted to open the gates throughout the said predetermined periods and to close the gates throughout the periods between the said predetermined periods.

19. Apparatus according to claim 18, wherein the timer comprises an oscillator adapted to run at an integral multiple of the frequency of the alternating current flow and in predetermined phase relation thereto, a series of binary dividers connected to the output of the oscillator, and gating means connected between first and second gates and the output of the oscillator and at least one of the binary dividers to provide signals for opening and closing the said first and second gates.

20. Apparatus according to claim 14, wherein the detector includes means for storing a fourth signal dependent upon a third signal and for applying to said means for storing a succeeding fourth signal dependent upon the next succeeding third signal, means for detecting a discharge from said means for storing and for generating a control signal when the discharge from said means for storing exceeds a predetermined value.

21. Apparatus according to claim 20, wherein said means for storing is adapted to derive each fourth signal as an exponential function of the corresponding third signal.

22. Apparatus according to claim 14, wherein the means for deriving first signals includes a first integrator, the means for deriving second signals includes a second integrator, and the means for deriving the third signals includes a gate connected between the output of one of the integrators and an input of the other integrator, the last said gate being opened after each predetermined period and closed when the output of the first integrator is reduced to zero, whereby the time for which the last said gate is open is dependent upon the impedance of the workpiece.